(12) United States Patent
Doolittle, III et al.

(10) Patent No.: US 6,203,089 B1
(45) Date of Patent: Mar. 20, 2001

(54) DEVICE FOR TRANSFORMING THE INTERIOR OF A VAN OR A SPORT UTILITY VEHICLE INTO A WORK VEHICLE

(75) Inventors: William W Doolittle, III, Ann Arbor; Del C Schroeder, Bloomfield Hills; Bryan Logan, Farmington Hills; David G Speth, Sylvan Lake, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/466,351

(22) Filed: Dec. 17, 1999

(51) Int. Cl.⁷ ................................................ B60R 13/01
(52) U.S. Cl. .......................................................... 296/39.1
(58) Field of Search ............................................. 296/39.1

(56) References Cited

U.S. PATENT DOCUMENTS

| | | | |
|---|---|---|---|
| 1,262,025 | * 4/1918 | Dickson | 296/39.1 |
| 2,712,797 | * 7/1955 | Woehrle et al. | 296/39.1 |
| 3,951,284 | * 4/1976 | Fell et al. | 214/152 |
| 4,461,402 | * 7/1984 | Fell et al. | 222/105 |
| 4,671,733 | * 6/1987 | Krein | 414/786 |
| 4,877,281 | * 10/1989 | Altmann | 296/39.1 |
| 4,917,431 | * 4/1990 | McDonald | 296/39.1 |
| 5,040,693 | * 8/1991 | Podd, Sr. et al. | 220/1.5 |

* cited by examiner

Primary Examiner—D. Glenn Dayoan
Assistant Examiner—Mickki D. Murray
(74) Attorney, Agent, or Firm—Ken Maclean

(57) ABSTRACT

A protective liner is provided for vehicles having a rear hatch or opening doors. The protective liner attaches to the opening of the rear hatch or opening and extends into the rear vehicle cavity protecting the vehicle interior form damage and debris when the vehicle is used for hauling lumber, logs, sand, gravel or debris.

14 Claims, 5 Drawing Sheets

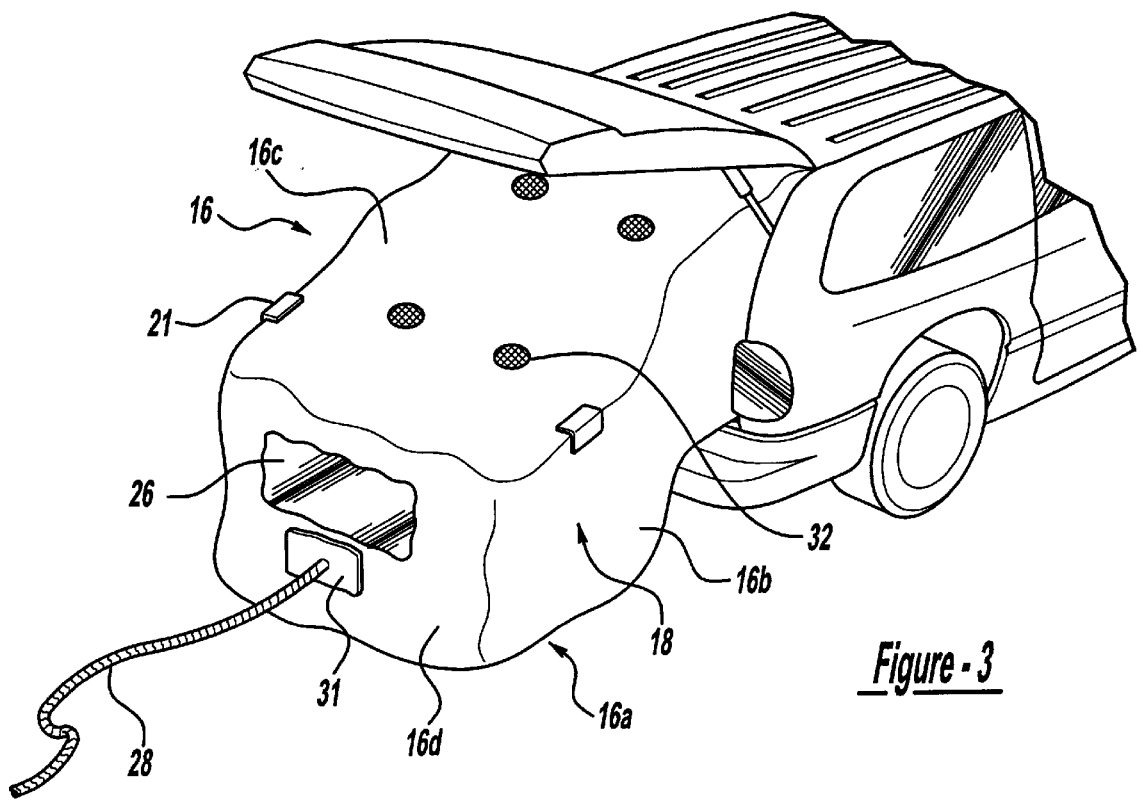
_Figure - 3_
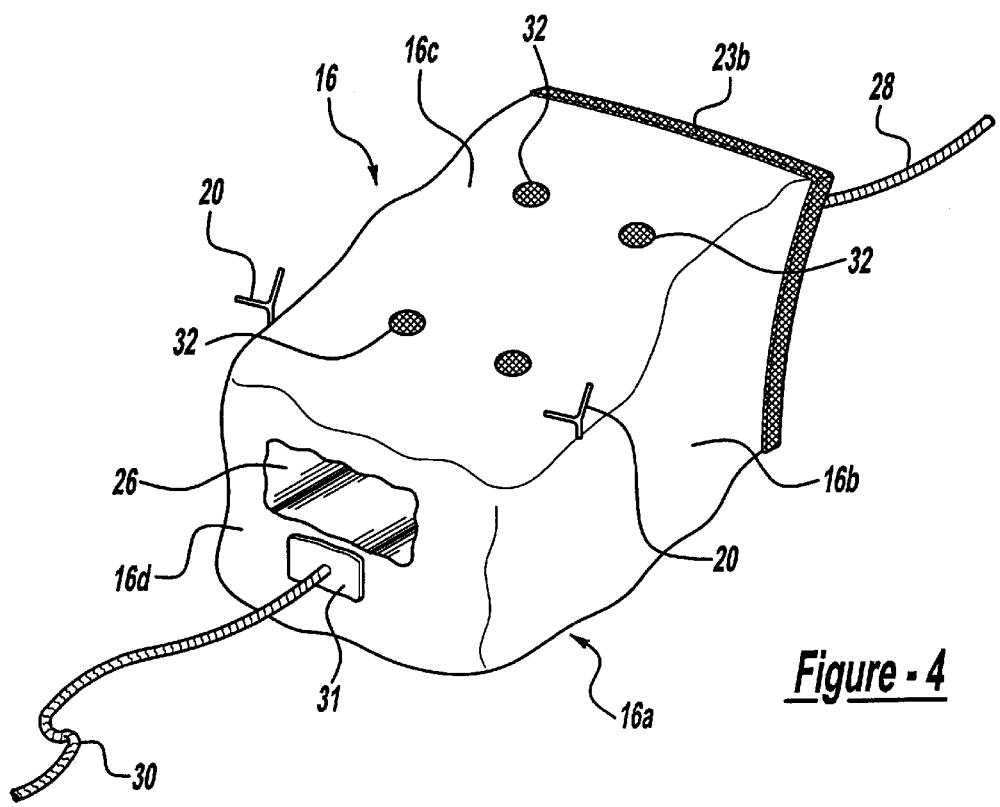
_Figure - 4_

DEVICE FOR TRANSFORMING THE INTERIOR OF A VAN OR A SPORT UTILITY VEHICLE INTO A WORK VEHICLE

FIELD OF THE INVENTION

The present invention relates generally to a device for transforming the interior of a motor vehicle having a rear hatch or opening into a work vehicle, and more particularly to a bag-like protective liner and a telescopic plastic floor covering which individually or in combination transform the interior of a motor vehicle into an environment suitable for transporting cargo in the fashion as a pick-up truck.

BACKGROUND AND SUMMARY OF THE INVENTION

The interior of a motor vehicle having a rear hatch or opening, such as a van, minivan, SUV or station wagon, has been designed to allow users to carry a variety of things in the rear portion of the vehicle, similar to the functional purposes of a flat bed truck. In addition to providing a means for transporting objects, the interior of a van, minivan, SUV or station wagon is designed to provide a clean and comfortable environment to the people, pets or objects which are being carried. The ability to carry a variety of things in the rear part of a motor vehicle is one of the key features in designing a motor vehicle with a rear hatch or opening.

In order to maintain a clean environment within a motor vehicle when transporting utility cargo such as lumber, logs, sand, gravel or small shrubs, a temporary liner must be put in place to protect the upholstered environment of the motor vehicle. If a temporary liner is not available to the user and the utility cargo is placed within the motor vehicle without using some sort of protective covering, the interior of the motor vehicle has the potential of becoming damaged due to dirt or other debris left from the cargo being carried. In addition to potentially damaging the upholstery of the interior of the motor vehicle, any mechanical devices located on the floor of the motor vehicle, such as seat floor anchors, could become damaged or non-functional due to debris being trapped within these devices.

The present invention provides two embodiments (which can be used in combination or separately) of a protective liner which allows the interior of a motor vehicle to be protected from cargo being transported. One embodiment of the present invention is a bag-like protective liner which reflects the size and shape of the interior of the motor vehicle with a rear hatch or opening. The internal protective liner maintains a clean and protective environment within the vehicle's interior cavity, therefore the interior of the motor vehicle can quickly change from transporting cargo to carrying people. In general the protective liner transforms a motor vehicle having a rear hatch or opening into or resembling a truck-like embodiment for functional cargo carrying purposes.

The second embodiment of the protective liner is a telescopic, collapsible plastic floor covering. This floor covering embodiment transforms a motor vehicle having a rear hatch or opening into a vehicle which has the functional capabilities similar to those of a flat bed or pick-up truck. The telescopic floor covering is comprised of a plurality of slidable plates that are interlocked. Each individual slidable plate is proportionally smaller than the adjacent plate and is connected in a forward configuration, thereby allowing the plates to slide on top of one another. The collapsible configuration allows the plastic floor covering to be stored easily as well as be adjustable relative to the size of the cargo being transported.

Each protective liner embodiment provides a device for protecting the interior of a motor vehicle while allowing for various cargoes to be transported.

BRIEF DESCRIPTION OF THE DRAWINGS

The present invention will become more fully understood from the detailed description and the accompanying drawings, wherein:

FIG. 3 is a rear perspective view of a motor vehicle having the bag-like protective liner partially disposed within the interior cavity of the motor vehicle;

FIG. 4 is a perspective view of the protective liner according to the principles of the present invention.

DETAILED DESCRIPTION OF THE PREFERRED EMBODIMENTS

Figure 1:
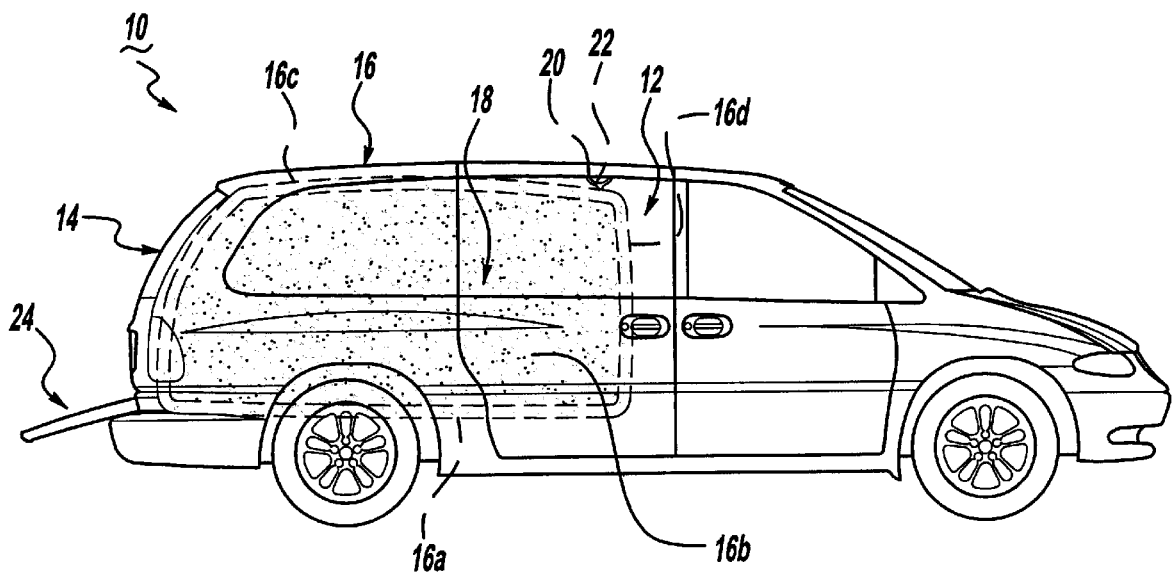
FIG. 1 is a side view of a motor vehicle having a rear hatch or opening with the bag-like protective liner disposed within the rear interior cavity of the motor vehicle.

Referring first to FIG. 1 which is a side perspective view of a motor vehicle 10 having a rear interior cavity 12 and a rear hatch or opening 14 disposed in a rear opening 15. A protective liner 16 is disposed within the rear interior cavity 12 of the motor vehicle 10.

Specifically, the protective liner includes a floor portion 16a disposed between two oppositely disposed sidewall portions 16b which extend generally from a floor of the vehicle to the ceiling. A ceiling portion 16c extends along the ceiling of the vehicle and is attached to the sidewall portions 16b. A forward end wall portion 16d is attached to the sidewall portions 16b, floor portion 16a and ceiling portion 16c and is adapted to extend generally from the floor to the ceiling of the motor vehicle. The protective liner 16 provides an internal compartment 18 for the transporting of cargo which can include logs, lumber, sand, gravel, small shrubs, along with many other things.

The protective liner 16 has a bag like shape which reflects the size and shape of the rear interior cavity 12 of the motor vehicle 10. The protective liner's 16 surface is composed of a flexible fabric such as canvas, a strong plastic film or a combination of fabric and film. The material which comprises the protective liner 16 allows the liner to be flexible as well as durable throughout use. The protective liner material is assembled into a bag-like configuration by a variety of sewing and plastic assembly processes, which can include sewing, gluing, bonding, seam welding, hot fusing or any additional techniques that are known in the art.

As seen in FIG. 1, the protective liner 16 is assembled to reflect the shape of the rear interior cavity 12 of the motor vehicle 10. This particular configuration allows the user of the protective liner 16 to maximize the amount of cargo that can be transported within the rear interior cavity 12 of the motor vehicle 10, while simultaneously protecting the interior surface of the motor vehicle from damage.

In addition to the unique size and shape of the protective liner, multiple liner attachments 20, which include hooks or straps, are disposed upon the external surface of the protective liner 16 in order to secure the protective liner 16 to respective attachment means within the motor vehicle 10. The liner attachments 20 which are disposed upon the upper external surface of the protective liner 16 can be attached to interior handles 22, such as upper entry or egress handles or coat hanger hooks, which are found within the rear interior cavity 12 of the motor vehicle 10. Attachments 20 preferably include ties although a variety of attachment means may also be provided. The additional feature of the liner attachments 20 allows the protective liner 16 to be securely attached to or near the ceiling within the interior cavity 12 of the motor vehicle 10. This configuration provides a fully opened internal compartment 18 of the protective liner 16 as is represented in FIG. 1. The protective liner 16 is reinforced by reinforcement patches 21 in the area where the attachments 20 are connected to the protective liner 16.

Figure 2:
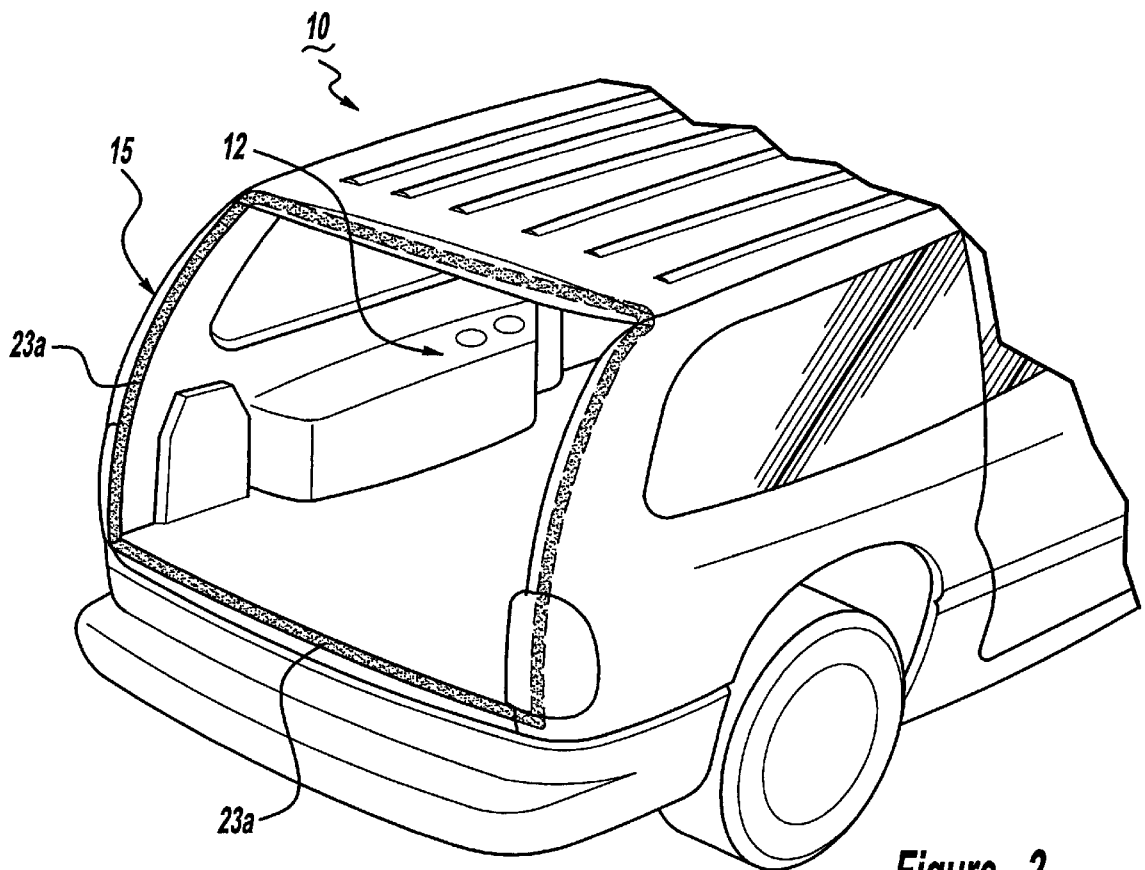
FIG. 2 is a rear perspective view of a motor vehicle having a rear hatch or opening removed showing the interior cavity where the protective liners would be placed.

The bag-like protective liner 16 is placed within the interior cavity 12 of the motor vehicle 10 through the rear hatch or opening 15. As can be seen in FIG. 2, the rear hatch or opening is lined, 360 degree circumference, with one component 23 of a hook and loop mechanism. Many different types of fastening mechanisms can be used to attach the protective liner 16 to the rear hatch or opening 15, although in this particular embodiment a hook and look type fastener is preferred. In order to attach the bag-like protective liner 16 to the motor vehicle 10, a corresponding portion of the hook and loop mechanism 23b is located around the outside edge of the bag-like protective liner's opening (best shown in FIG. 4). Upon placing the protective liner 16 within the internal cavity 12 of the motor vehicle 10 the hook or loop portion 23b of the attachment mechanism which is located around the circumference of the opening of the protective liner 16 is attached to the corresponding hook or loop attachment mechanism 23a which is located around the perimeter of the rear hatch opening 15. The attachment of the hook and loop mechanism around the perimeter of the rear opening 15 secures the bag-like protective liner 16 within the interior cavity 12 and ensures that the opening of the bag-like protective liner 16 conforms to the opening 15 of the rear hatch or opening. Alternatively, a plastic retainer can be attached to the liner that is engaged with a mating retainer mounted in the opening 15.

Additional features of the bag-like protective liner can be seen in FIG. 1. A tailgate end flap 24 may be attached to the open end of the protective liner 16 to prevent damage that may occur to the vehicle's rear door upon transporting the cargo within the protective liner 16. The tailgate end flap 24 also provides a means for transporting the cargo within the protective liner 16 in an enclosed environment in circumstances where the rear hatch or opening 14 of the motor vehicle would need to be opened due to the size of the cargo being transported. Once the cargo is done being transported, the tailgate end flap 24 of the protective liner 16 can be opened and serves as a protective panel over the bumper of the motor vehicle while the cargo is being emptied out of the liner.

FIG. 3 shows the protective liner 16 having its open end attached to the rear hatch or opening and pulled inside out.

A clear plastic window 26 similar to those sewn into convertible tops may also be placed within the forward end wall portion 16d of the protective liner 16 allowing the operator of the motor vehicle to maintain a fully functional rear view mirror. A corresponding clear plastic window (not shown) would be placed in the tailgate end flap 24 and could optionally be provided in the sidewall portions 16b of the liner 16. A clear window could also be provided in the ceiling portion 16c corresponding to the location of a dome light provided in the ceiling of the rear interior cavity 12.

An additional feature of the protective liner is a pair of ropes 28, 30 which are attached to opposite sides of the forward end wall portion 16d of the protective liner 16. The rope 28 is attached to an interior surface of the forward end wall portion 16d while the rope 30 is attached to an exterior surface of the forward end wall portion 16d. The rope 28 which is approximately 15 feet in length allows the user to stand outside of the motor vehicle behind the rear hatch or opening and pull the protective liner 16 from the motor vehicle's interior cavity 12. In addition, the rope 30 allows the user to initially pull the protective liner 16 into the interior cavity 12 of the motor vehicle if necessary. A reinforced area 31 made of fabric or other suitable material is attached to the forward end wall portion 16d and surrounds the area where the ropes 28 and 30 attach to the forward end wall portion 16d to support and protect the protective liner from damage or ripping. The addition of the ropes 28 and 30 provide convenience and safety for the user when transporting the protective liner into and out of the interior cavity 12 of the motor vehicle.

An additional feature of the protective liner 16 is a plurality of vents 32 that can be located on the protective liner 16. The vents 32 allow for circulation of air within the protective liner and so that air pockets do not form inside to prevent easy folding and manipulation inside the interior cavity 12. The vents 32 are most preferably placed on the top portion of the protective liner due to the variety of contents which can be carried by the protective liner and may spill out of the protective liner 16 if the vents 32 are placed in any other configuration. As discussed previously with reference to FIG. 1, liner attachments 20 are shown disposed on the protective liner allowing the upper corners of the protective liner to be attached to the interior handles 22 of the motor vehicle.

In addition to the bag-like protective liner 16 which is flexible, an additional plastic flooring can be disposed within the bag-like protective liner to provide further protection. This plastic floor covering can have a variety of configurations from a roll-up plastic sheet to a more complex plastic flooring. A particular embodiment which can be used with the bag-like protective liner 16 or without can be seen in FIG. 5.

Figure 5:
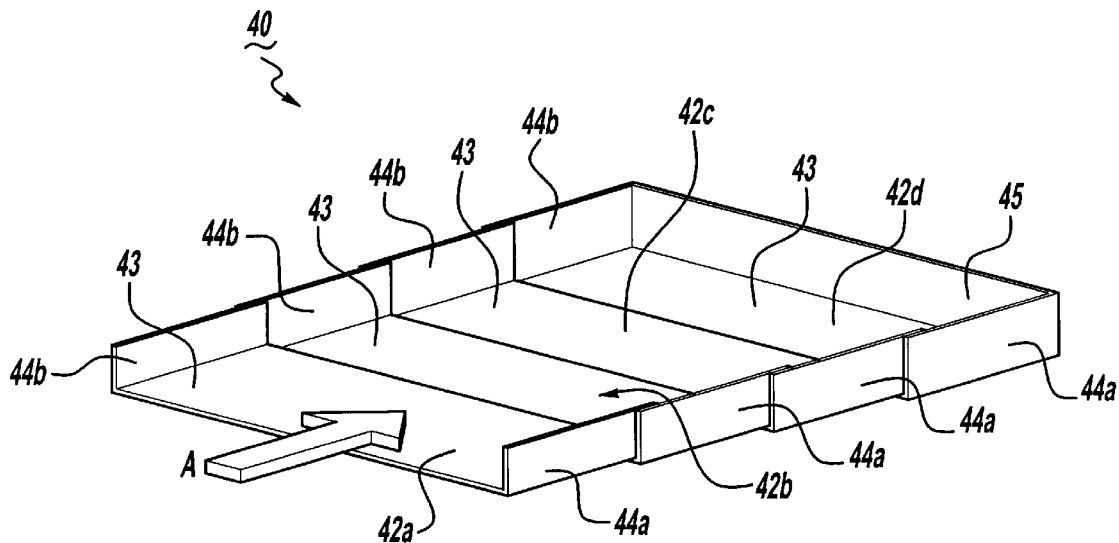
FIG. 5 is a perspective view of the telescopic plastic floor covering which is alternate embodiment of a protective liner that may be disposed within the interior cavity of a motor vehicle having a rear hatch or opening.
Figure 7:
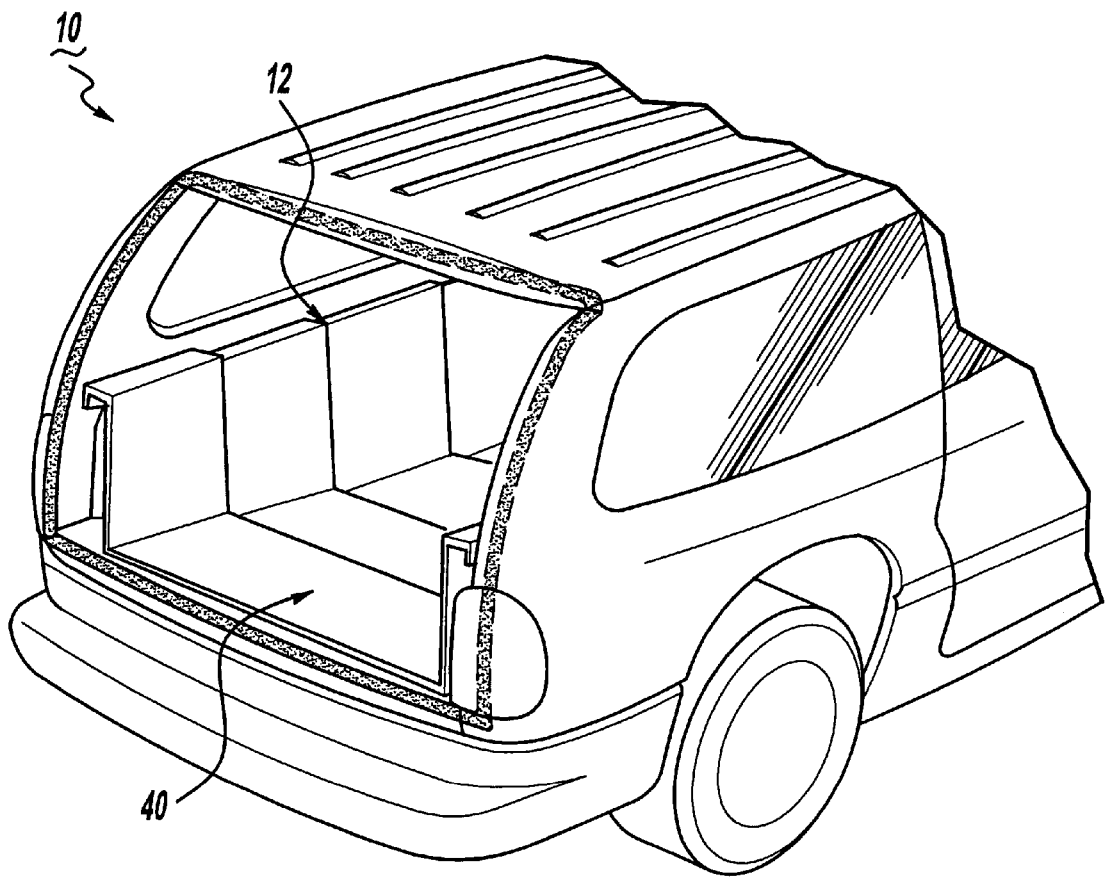
FIG. 7 is a rear perspective view showing an alternate embodiment of the protective liner which is a telescopic plastic floor cover disposed within the interior of the motor vehicle.

A telescopically collapsible plastic floor covering 40, as seen in FIG. 5, can be used both with or without the bag-like protective liner 16. The plastic floor covering 40 is comprised of a series of heavy duty plastic sliding panels 42a–42d which are telescopically collapsible. The collapsible plastic floor covering 40 provides a bed liner for a motor vehicle 10 having a rear hatch or opening 14, as best shown in FIG. 7, similar to a bed liner used in the back of a pick-up truck.

This particular embodiment of the collapsible plastic floor covering 40 consists of a series of heavy duty thick polymeric sliding panels 42a–42d, for example four are used in the example shown. The plastic sliding panels 42a–42d can have a variety of thicknesses depending on the needs of the user, although a thickness of ⅛" to ½" is most preferable in this particular configuration. The plastic panels 42a–42d are preferably reinforced using known reinforcement techniques. Specifically, an embedded wire mesh or fibers can be used to reinforce the plastic panels. In addition, a layer of foam may be provided between plastic layers to reinforce the panels.

Three of the four plastic panels 42a–42c are designed to have a bottom portion 43 and two corresponding side portions 44a and 44b located on each end and disposed in a perpendicular direction to the bottom portion 43, thereby providing an edge for the panels. The fourth panel 42d includes a bottom portion 43, two corresponding side portions 44a and 44b and a back portion 45, which provides a back support to the collapsible plastic floor coving 40. Although multiple dimensions are possible, specific dimensions have been designated as utilizing the collapsible plastic floor covering 40 to its full potential. The bottom portion 43 has the dimensions of 46" wide and 18" deep, allowing the collapsible plastic floor covering 40 to be placed within the rear interior cavity 12 of a motor vehicle 10 through a hatch or opening 15. Furthermore, the side portions 44a and 44b of the sliding plastic panels 42a–42d are preferably 15" tall. Although this height limits the amount of material that may be placed in the liner 40, it is designed to insure that the rear axle of the vehicle is not overloaded.

The plastic sliding panels 42a–42d are placed in an overlapping configuration that provides a shingle effect. The sliding panels 42 are overlapped in a forward direction which provides a smooth surface for the flooring upon the extension of the sliding panels. Each sliding panel 42a–42d is proportionally smaller than its adjacent sliding panel allowing the plastic flooring to be collapsible into a single panel configuration, which is the fourth panel 42d which defines a back portion. Upon sliding the plastic panels 42 in the direction of the arrow A, as indicated in FIG. 5, each sliding panel 42a–42d may be placed on top of the next one allowing for the floor covering to decrease in size.

Figure 6A:
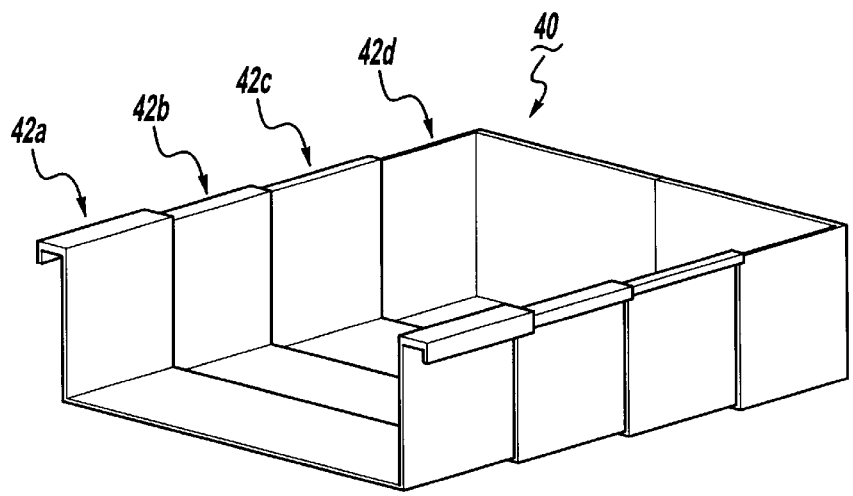
FIGS. 6(a)–6(d) are perspective views of the telescopic plastic floor covering wherein the telescopic plates are in a variety of positions.
Figure 6B:
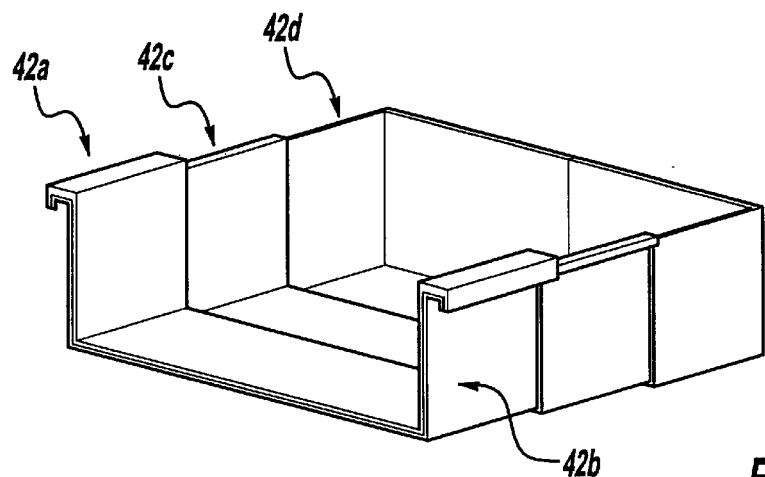
Figure 6C:
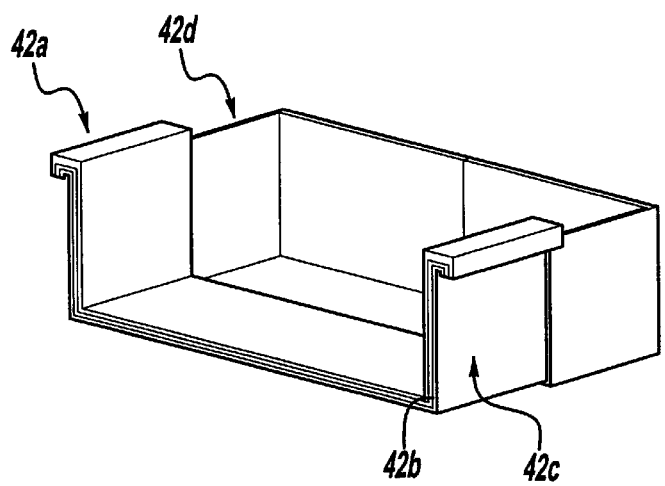
Figure 6D:
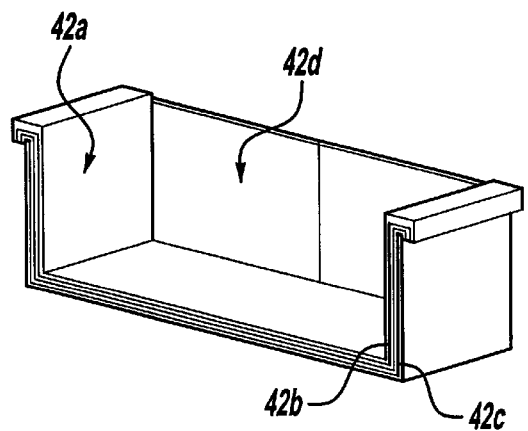

Upon fully extending the sliding panels 42a–42d of a floor covering four distinct panels 42a–42d can be seen in FIG. 6(a) which comprise the plastic floor covering 40. The proportionally smaller plastic panel 42a can be slid over the adjacent plastic panel 42b leaving a three panel configuration for the plastic floor covering as seen in FIG. 6(b). Subsequently the first and second plastic panels 42a, 42b can be slid over the third plastic panel 42c leaving a two plate configuration as seen in FIG. 6(c). Lastly, all plastic panels may be slid into a collapsible configuration, as seen in FIG. 6(d), leaving only one plastic panel having the side portions 44(a) and 44(b) of each panel 42a–42d overlapped, a back portion 45 of panel 42d, as well as a total of four bottom portions 43 stacked together in a collapsible configuration.

The design of the collapsible plastic floor covering 40 allows for a variety of configurations which may be dependent upon the amount of materials or cargo being transported. In addition to the adjustable size of the collapsible plastic floor covering 40, the forward overlapping attachment of each sliding panel 42 allows for a shovel or any other tool being used to slide along the bottom portion 43 of the plastic floor covering 40 without catching or potentially causing damage to the bottom portion 43 or side portion of the floor covering. This particular plastic floor covering allows a motor vehicle having a rear hatch or opening to be transformed to be able to haul cargo like a pick-up truck.

Following use of the plastic floor covering, it may be removed from the internal cavity of the motor vehicle and washed with ease and stored outside of the motor vehicle.

The removal of the liner is also applicable to the bag-like protective liner which was described previously. Each embodiment of a protective liner allows the interior of a motor vehicle 12 to be protected when transporting a variety of cargo within the internal compartment 12 of a motor vehicle 10 having a rear hatch or opening 14. Thus, each embodiment is easily adaptable to be used with a van, mini-van, sport utility vehicle, station wagon or the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bag-like protective liner for the interior of a motor vehicle having a rear opening, said liner comprising:

a main body formed from sheet material and including a floor portion, a pair of sidewall portions attached to said floor portion, a ceiling portion attached to said sidewall portions and a forward end portion attached to said ceiling portion, said sidewall portions and said floor portion such that said main body reflects the size and shape of the rear interior cavity of said vehicle, said main body defining an internal compartment;

a rope attached to a forward end wall portion of said main body; and a plurality of attachments mounted to said main body adapted for securing said main body within the interior of the motor vehicle.

2. The protective liner according to claim 1 wherein said sheet material is fabric.

3. The protective liner according to claim 1 wherein said main body has an open end, said open end provides access to the internal compartment of said main body.

4. The protective liner according to claim 3 wherein said open end of said protective liner has a closure flap which allows for the protective liner resembling a bag to be fully closed.

5. The protective liner according to claim 3 wherein said open end of said main body is adapted to be attached to said motor vehicle by a hook and loop fastener.

6. The protective liner according to claim 5 wherein said forward end wall portion of said main body includes a window therein.

7. A bag-like protective liner for the interior of a motor vehicle having a rear opening, comprising:

a main body formed from sheet material and including a floor portion, a pair of sidewall portions attached to said floor portion, a ceiling portion attached to said sidewall portions and a forward end portion attached to said ceiling portion, said sidewall portions and said floor portion such that said main body reflects the size and shape of the rear interior cavity of said vehicle, said main body defining an internal compartments, wherein said main body has an open end, said open end provides access to the internal compartment of said main body, said open end of said main body is adapted to be attached to said motor vehicle by a hook and loop fastener; and a plurality of attachments mounted to said main body adapted for securing said main body within the interior of the motor vehicle, wherein said main body contains an outside edge around said open end, said outside edge is surrounded by one component of said hook and loop mechanism.

8. The protection liner according to claim 1 wherein said forward end wall portion of said main body is reinforced in an area where said rope connects with said forward end wall portion.

9. The protective liner according to claim 1 wherein said main body further includes a plurality of vents.

10. The protective liner according to claim 1 wherein said main body includes attachment means for attaching said ceiling portion of said main body to a ceiling of said vehicle.

11. The protective liner according to claim 10 wherein said attachment means are adapted to be attached to a plurality of interior handles located within an interior of the motor vehicle.

12. The protective liner according to claim 9 wherein said vents are located on a top portion of the protective liner.

13. The protective liner according to claim 3 wherein a plastic window is located within the closure flap.

14. A bag-like protective liner for the interior of a motor vehicle having a rear opening, comprising:

- a main body formed from sheet material and including a floor portion, a pair of sidewall portions attached to said floor portion, a ceiling portion attached to said sidewall portions and a forward end portion attached to said ceiling portion, said sidewall portions and said floor portion such that said main body reflects the size and shape of the rear interior cavity of said vehicle, said main body reflects the size and shape of the rear interior cavity of said vehicle, said main body defining an internal compartments;
- a plurality of attachments mounted to said main body adapted for securing said main body within the interior of the motor vehicle; and
- a first rope attached to an inner surface of said forward end wall portion and a second rope attached to an exterior surface of said forward end wall of said main body.

* * * * *